US012601510B2

(12) United States Patent

Lu

(10) Patent No.: US 12,601,510 B2

(45) Date of Patent: Apr. 14, 2026

(54) COOLING DISTRIBUTION UNIT AND ASSEMBLING/DISASSEMBLING METHOD THEREOF

(71) Applicant: Delta Electronics, Inc., Taoyuan City (TW)

(72) Inventor: Chao-Wen Lu, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 321 days.

(21) Appl. No.: 18/124,482

(22) Filed: Mar. 21, 2023

(65) Prior Publication Data

US 2024/0044529 A1 Feb. 8, 2024

(30) Foreign Application Priority Data

Aug. 5, 2022 (CN) .......................... 202210937936.1

(51) Int. Cl.
*F24F 5/00* (2006.01)
*F16L 29/02* (2006.01)

(52) U.S. Cl.
CPC ............ *F24F 5/0003* (2013.01); *F16L 29/02* (2013.01); *F24F 2221/36* (2013.01)

(58) Field of Classification Search
CPC ....... F24F 5/0003; F24F 2221/36; F16L 29/02
USPC ........................................ 361/688, 728–732
See application file for complete search history.

(56) References Cited

U.S. PATENT DOCUMENTS

| 4,909,315 | A | * | 3/1990 | Nelson ................ H01L 23/4336 165/185 |
| 4,914,550 | A | * | 4/1990 | Filsinger .............. H05K 7/1409 439/372 |
| 5,600,542 | A | * | 2/1997 | Malgouires .......... H05K 7/1467 361/747 |
| 5,793,614 | A | * | 8/1998 | Tollbom ............... H05K 7/1409 361/801 |
| 6,024,175 | A | * | 2/2000 | Moore, Jr. ............. F16K 15/18 169/37 |
| 6,052,278 | A | * | 4/2000 | Tanzer ................. G11B 33/128 361/728 |

(Continued)

FOREIGN PATENT DOCUMENTS

| CN | 104185530 A | 12/2014 |
| TW | M401971 U | 4/2011 |

(Continued)

*Primary Examiner* — Anatoly Vortman
(74) *Attorney, Agent, or Firm* — KIRTON McCONKIE; Evan R. Witt

(57) ABSTRACT

A cooling distribution unit includes a main body, a removable unit and an adjustment mechanism. The main body includes a first guiding structure. The removable unit includes a casing, a pump and a second guiding structure. The first guiding structure and the second guiding structure are coupled with each other. The adjustment mechanism includes a guiding slot and a fulcrum part. The guiding slot has a front end and a rear end. A distance between a center of the front end of the guiding slot and the fulcrum part is greater than a distance between a center of the rear end of the guiding slot and the fulcrum part. While the removable unit is locked on the main body or detached from the main body, the first guiding structure or the second guiding structure is disposed within the guiding slot.

11 Claims, 8 Drawing Sheets

(56)     References Cited

U.S. PATENT DOCUMENTS

| 6,222,736 | B1 * | 4/2001 | Sim | G06F 1/188 |
| | | | | 361/732 |
| 6,549,424 | B1 * | 4/2003 | Beseth | H05K 7/1409 |
| | | | | 361/801 |
| 6,680,851 | B1 * | 1/2004 | Fasullo | H05K 7/1409 |
| | | | | 361/740 |
| 7,405,935 | B1 * | 7/2008 | Carey | H05K 7/20345 |
| | | | | 165/80.1 |
| 8,613,306 | B2 * | 12/2013 | Tang | H05K 7/20272 |
| | | | | 165/80.4 |
| 9,541,221 | B2 | 1/2017 | Koyama et al. | |
| 9,582,050 | B2 * | 2/2017 | Tseng | G06F 1/1658 |
| 11,395,443 | B2 * | 7/2022 | Varela Benitez | H05K 7/20272 |
| 11,930,619 | B2 * | 3/2024 | Liang | H05K 7/20645 |
| 12,207,449 | B2 * | 1/2025 | Chen | H05K 7/20781 |
| 2014/0211423 | A1 * | 7/2014 | Nguyen | H05K 7/1409 |
| | | | | 361/728 |
| 2018/0372697 | A1 | 12/2018 | DeWitte et al. | |
| 2019/0182988 | A1 * | 6/2019 | Lunsman | H05K 7/20281 |
| 2020/0053916 | A1 * | 2/2020 | Bonnin | H05K 7/20781 |
| 2021/0352830 | A1 * | 11/2021 | Varela Benitez | F04D 29/026 |
| 2022/0248570 | A1 * | 8/2022 | Chen | H05K 7/20272 |

FOREIGN PATENT DOCUMENTS

| TW | M598367 | U | 7/2020 |
| TW | 202210716 | A | 3/2022 |

* cited by examiner

125

126

127

1262

1261

1263

1271

1272

COOLING DISTRIBUTION UNIT AND ASSEMBLING/DISASSEMBLING METHOD THEREOF

CROSS-REFERENCE TO RELATED APPLICATION

This application claims the priority to Chinese Patent Application No. 202210937936.1 filed on Aug. 5, 2022, the entire contents of which are incorporated herein by reference for all purposes.

FIELD OF THE INVENTION

The present disclosure relates to a cooling distribution unit (CDU) and an assembling/disassembling method thereof, and more particularly to a cooling distribution unit with a quick release structure and an assembling/disassembling method thereof.

BACKGROUND OF THE INVENTION

In most of the conventional cooling distribution units, pumps are directly fixed in the cooling distribution units. In other words, the pump cannot be quickly released and hot swapped from the cooling distribution units. For solving the above drawbacks, some cooling distribution units are equipped with quick release pumps. The quick release pump is assembled with the main body of the cooling distribution unit. For disassembling the quick release pump from the main body of the cooling distribution unit, it is necessary to apply a force of about 400N. For saving effort, a screw structure is used to disassemble the pump. However, due to the limitation of the screw structure, the pump can be removed after the nut is completely separated from the cooling distribution unit. In other words, the process of disassembling the pump from the cooling distribution unit is slow, and the disassembling process is complicated.

Therefore, there is a need of providing an improved cooling distribution unit and an assembling/disassembling method of the cooling distribution unit in order to overcome the drawbacks of the conventional technologies.

SUMMARY OF THE INVENTION

The present disclosure provides a cooling distribution unit and an assembling/disassembling method of the cooling distribution unit. The cooling distribution unit includes a main body, a removable unit with a pump and an adjustment mechanism. The removable unit can be selectively locked on the main body or detached from the main body in an effort-saving manner by simply rotating the adjustment mechanism. Consequently, the purpose of assembling or disassembling the cooling distribution unit can be achieved. Moreover, the process of replacing the pump is simplified and performed at a faster speed.

In accordance with an aspect of the present disclosure, a cooling distribution unit is provided. The cooling distribution unit includes a main body, a removable unit and an adjustment mechanism. The main body includes at least one first guiding structure. The removable unit includes a casing, a pump and at least one second guiding structure. The pump is disposed within the casing. The at least one first guiding structure and the at least one second guiding structure are coupled with each other. The adjustment mechanism includes at least one guiding slot and at least one fulcrum part. Each of the at least one guiding slot has a front end and a rear end. The front end has an entrance. A distance between a center of the front end of the guiding slot and the corresponding fulcrum part is greater than a distance between a center of the rear end of the guiding slot and the corresponding fulcrum part. While the removable unit is locked on the main body or the removable unit is detached from the main body, the at least one first guiding structure or the at least one second guiding structure is disposed within the corresponding guiding slot.

In accordance with another aspect of the present disclosure, an assembling/disassembling method of a cooling distribution unit is provided. The assembling/disassembling method includes following steps. Firstly, a main body, a removable unit, a guiding structure and an adjustment mechanism are provided. The removable unit includes a pump. The guiding structure is disposed on the main body or the removable unit. The adjustment mechanism includes a guiding slot and a fulcrum part. The guiding slot has a front end and a rear end. The front end has an entrance. A distance between a center of the front end of the guiding slot and the fulcrum part is greater than a distance between a center of the rear end of the guiding slot and the fulcrum part. Then, the adjustment mechanism is rotated, and the guiding structure is selectively moved from the entrance of the front end of the guiding slot to the rear end of the guiding slot or moved from the rear end of the guiding slot to the entrance of the front end of the guiding slot. When the guiding structure is moved from the entrance of the front end of the guiding slot to the rear end of the guiding slot in response to a rotation of the adjustment mechanism, the removable unit is locked on the main body. When the guiding structure is moved from the rear end of the guiding slot to the entrance of the front end of the guiding slot in response to the rotation of the adjustment mechanism, the removable unit is detached from the main body.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
FIG. 1 is a schematic perspective view illustrating the appearance of a cooling distribution unit according to an embodiment of the present disclosure.
Figure 1:
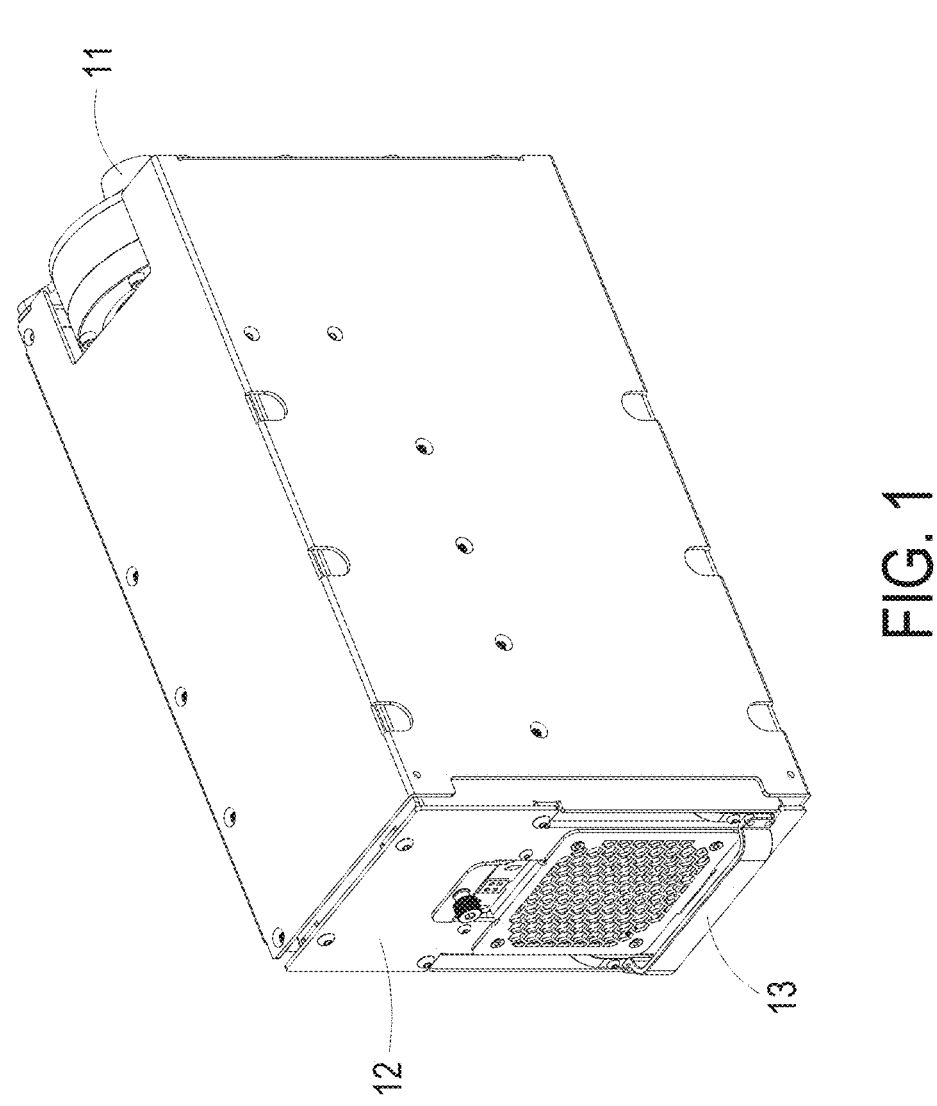
Figure 2A:
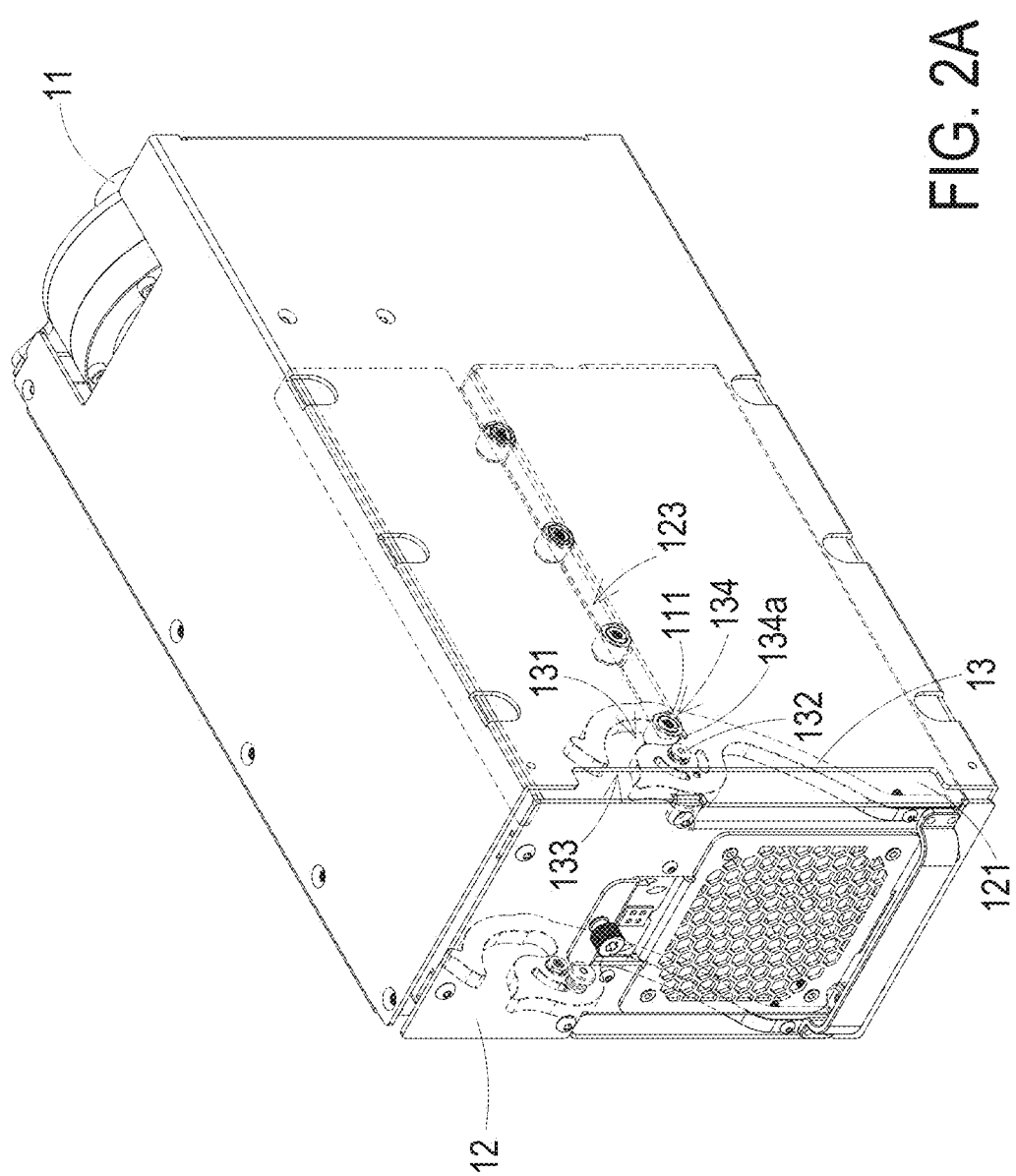
FIGS. 2A and 2B are schematic perspective views illustrating portions of the inner structure of the cooling distribution unit according to the embodiment of the present disclosure.
Figure 2B:

FIG. 1 is a schematic perspective view illustrating the appearance of a cooling distribution unit according to an embodiment of the present disclosure. FIGS. 2A and 2B are schematic perspective views illustrating portions of the inner structure of the cooling distribution unit according to the embodiment of the present disclosure.

As shown in FIGS. 1, 2A and 2B, the cooling distribution unit 1 includes a main body 11, a removable unit 12 and an adjustment mechanism 13.

The main body 11 includes at least one first guiding structure 111. Preferably but not exclusively, the first guiding structure 111 is protruded from the main body 11. For clearly understanding the concepts of the present disclosure, only a portion of the main body 11 is shown in the drawings. That is, the portion of the main body 11 connected with the removable unit 12 is shown in the drawings.

In an embodiment, the removable unit 12 includes a casing 121, a pump 122 and at least one second guiding structure 123. The pump 122 is disposed within the casing 121. The second guiding structure 123 is coupled with the first guiding structure 111. Preferably but not exclusively, the second guiding structure 123 is protruded from the removable unit 12.

In an embodiment, the adjustment mechanism 13 includes at least one guiding slot 131 and a fulcrum part 132. The guiding slot 131 has a front end 133 and a rear end 134. The front end 133 has an entrance 133a. When the entrance direction and the extending direction of the guiding slot 131 are in the same direction, the rotation of the adjustment mechanism 13 can be easier and less laborious. Moreover, the distance d1 between the center of the front end 133 and the fulcrum part 132 is greater than the distance d2 between the center of the rear end 134 and the fulcrum part 132. By rotating the adjustment mechanism 13 with respect to the fulcrum part 132, the removable unit 12 can be selectively locked on the main body 11 or detached from the main body 11. The associated operations will be described later.

During the process of locking the removable unit 12 on the main body 11 or detaching the removable unit 12 from the main body 11, the first guiding structure 111 or the second guiding structure 123 is disposed within the guiding slot 131.

In an embodiment, the first guiding structure 111 of the main body 11 is a cam, and the second guiding structure 123 of the removable unit 12 is a guide rail. In this situation, the fulcrum part 132 of the adjustment mechanism 13 is fixed on the removable unit 12. During the process of locking the removable unit 12 on the main body 11 or detaching the removable unit 12 from the main body 11, the cam (i.e., the first guiding structure 111) is disposed within the guiding slot 131. While the adjustment mechanism 13 is rotated, the cam (i.e., the first guiding structure 111) is moved within the guiding slot 131 and moved along the guide rail (i.e., the second guiding structure 123).

In another embodiment, the first guiding structure 111 of the main body 11 is a guide rail, and the second guiding structure 123 of the removable unit 12 is a cam. In this situation, the fulcrum part 132 of the adjustment mechanism 13 is fixed on the main body 11. During the process of locking the removable unit 12 on the main body 11 or detaching the removable unit 12 from the main body 11, the cam (i.e., the second guiding structure 123) is disposed within the guiding slot 131. While the adjustment mechanism 13 is rotated, the cam (i.e., the second guiding structure 123) is moved within the guiding slot 131 and moved along the guide rail (i.e., the first guiding structure 111).

The examples of the first guiding structure 111 and the second guiding structure 123 are not restricted as long as the first guiding structure 111 and the second guiding structure 123 are movable relative to each other in response to the rotation of the adjustment mechanism 13. Consequently, the removable unit 12 can be selectively locked on the main body 11 or detached from the main body 11.

Moreover, while the first guiding structure 111 or the second guiding structure 123 within the guiding slot 131 is moved from the rear end 134 of the guiding slot 131 to the front end 133 of the guiding slot 131 in response to the rotation of the adjustment mechanism 13, the distance between the first guiding structure 111 (or the second guiding structure 123) and the fulcrum part 132 is gradually increased.

Figure 3A:
FIGS. 3A, 3B and 3C are schematic cross-sectional views illustrating an assembling/disassembling method of the cooling distribution unit.
Figure 3A:
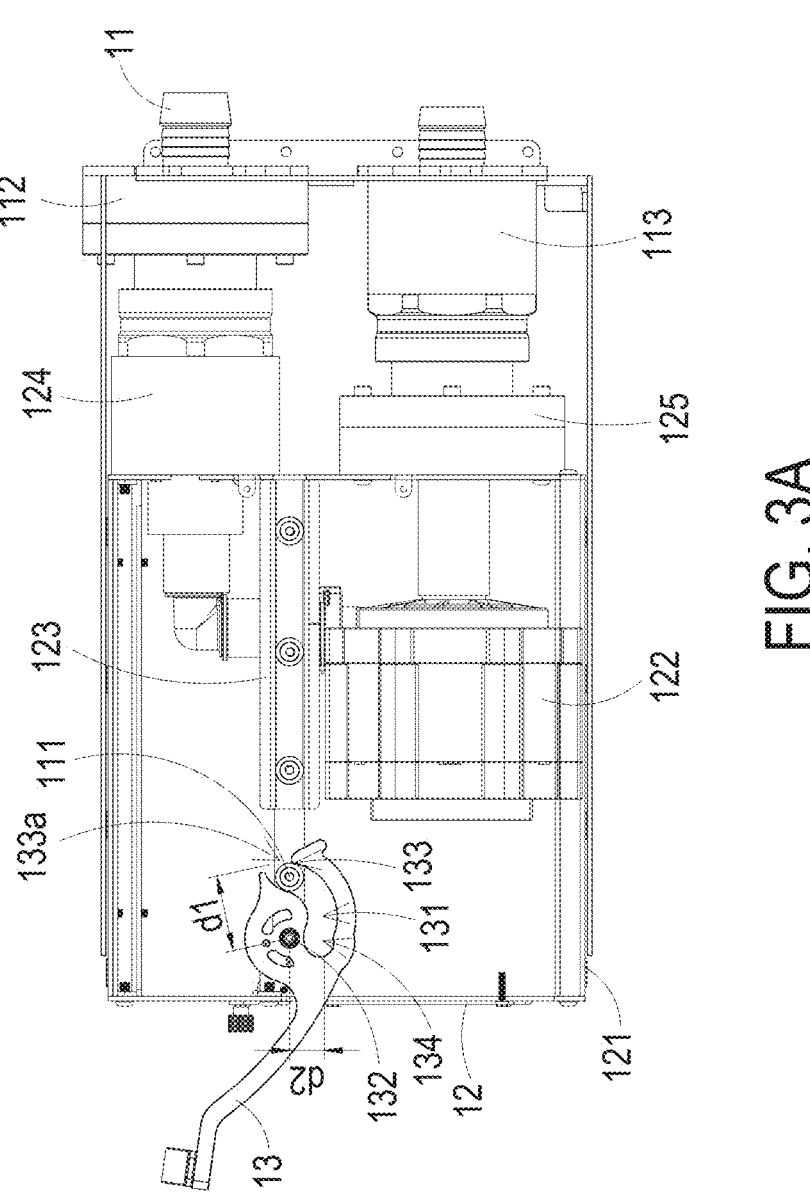
Figure 3B:
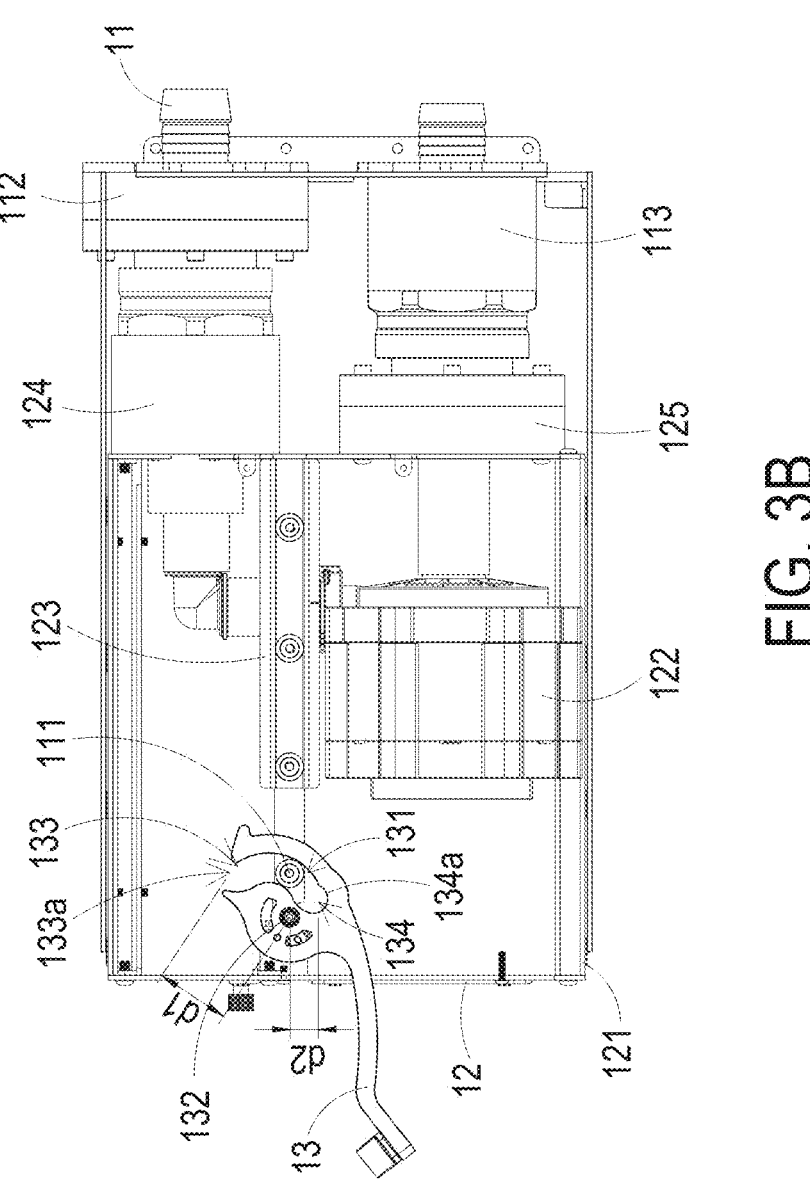
Figure 3C:
Figure 3C:
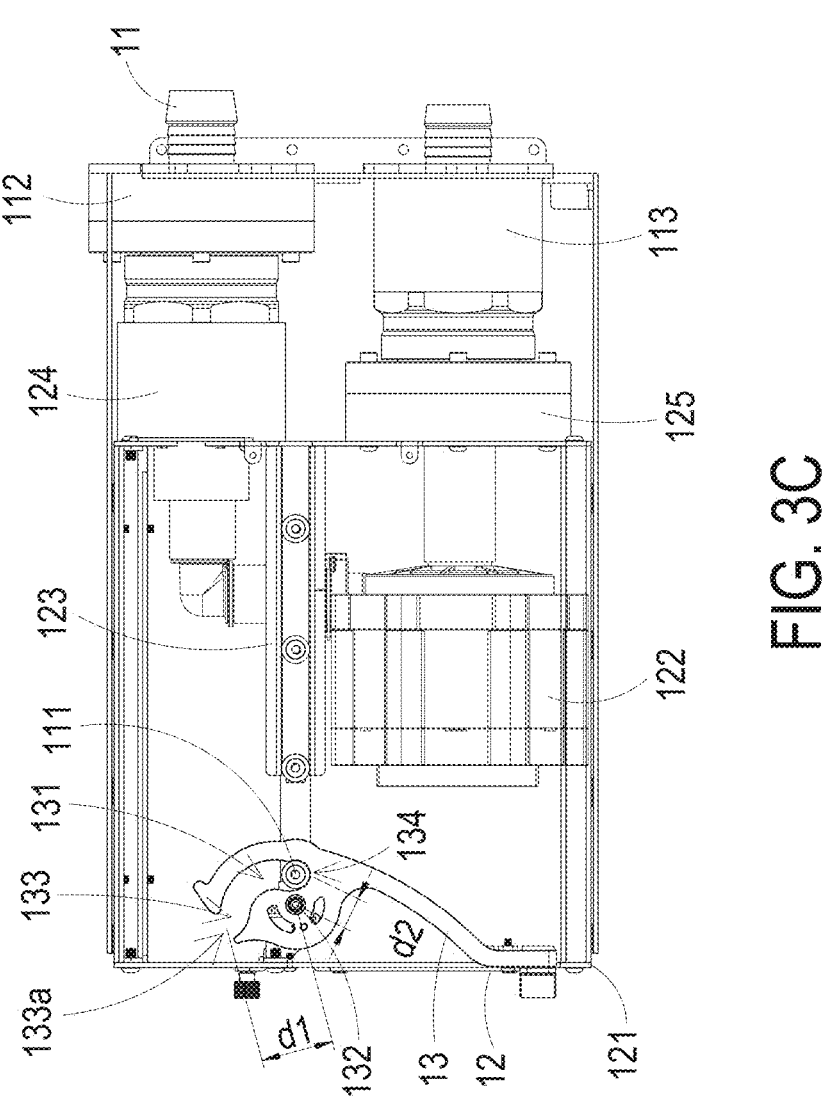

FIGS. 3A, 3B and 3C are schematic cross-sectional views illustrating an assembling/disassembling method of the cooling distribution unit.

A process of assembling the cooling distribution unit 1 will be described as follows.

Please refer to FIG. 3A. Firstly, the removable unit 12 is moved toward the main body 11. Consequently, the first guiding structure 111 is located in the front end 133 of the guiding slot 131, and the first guiding structure 111 and the second guiding structure 123 are coupled with each other. In an embodiment, the first guiding structure 111 of the main body 11 is a cam, and the second guiding structure 123 of the removable unit 12 is a guide rail. It is noted that numerous modifications and alterations may be made while retaining the teachings of the disclosure. For example, in another embodiment, the first guiding structure 111 and the second guiding structure 123 are coupled with each other before the first guiding structure 111 is contacted with the adjustment mechanism 13. Consequently, the removable unit 12 can be moved toward the main body 11.

Please refer to FIG. 3B. Then, the adjustment mechanism 13 is rotated. Consequently, the first guiding structure 111 in the front end 133 of the guiding slot 131 is moved in the direction toward the rear end 134 of the guiding slot 131.

Please refer to FIG. 3C. As the adjustment mechanism 13 is continuously rotated, the first guiding structure 111 is moved to the rear end 134 of the guiding slot 131. Meanwhile, the removable unit 12 is locked on the main body 11.

As mentioned above, the distance d1 between the center of the front end 133 and the fulcrum part 132 is greater than the distance d2 between the center of the rear end 134 and the fulcrum part 132. During the assembling process, the first guiding structure 111 is moved from the front end 133 of the guiding slot 131 to the rear end 134 of the guiding slot 131 in response to the rotation of the adjustment mechanism 13. As the first guiding structure 111 is moved from the front end 133 of the guiding slot 131 to the rear end 134 of the guiding slot 131, the removable unit 12 is moved toward the main body 11 and locked on the main body 11.

After the removable unit 12 is locked on the main body 11, the pump 122 of the removable unit 12 is in communication with the main body 11.

In the above process of assembling the cooling distribution unit 1, the first guiding structure 111 is moved from the front end 133 of the guiding slot 131 to the rear end 134 of the guiding slot 131 in response to the rotation of the adjustment mechanism 13. That is, the step of FIG. 3A, the step of FIG. 3B and the step of FIG. 3C are performed sequentially.

Figure 4:
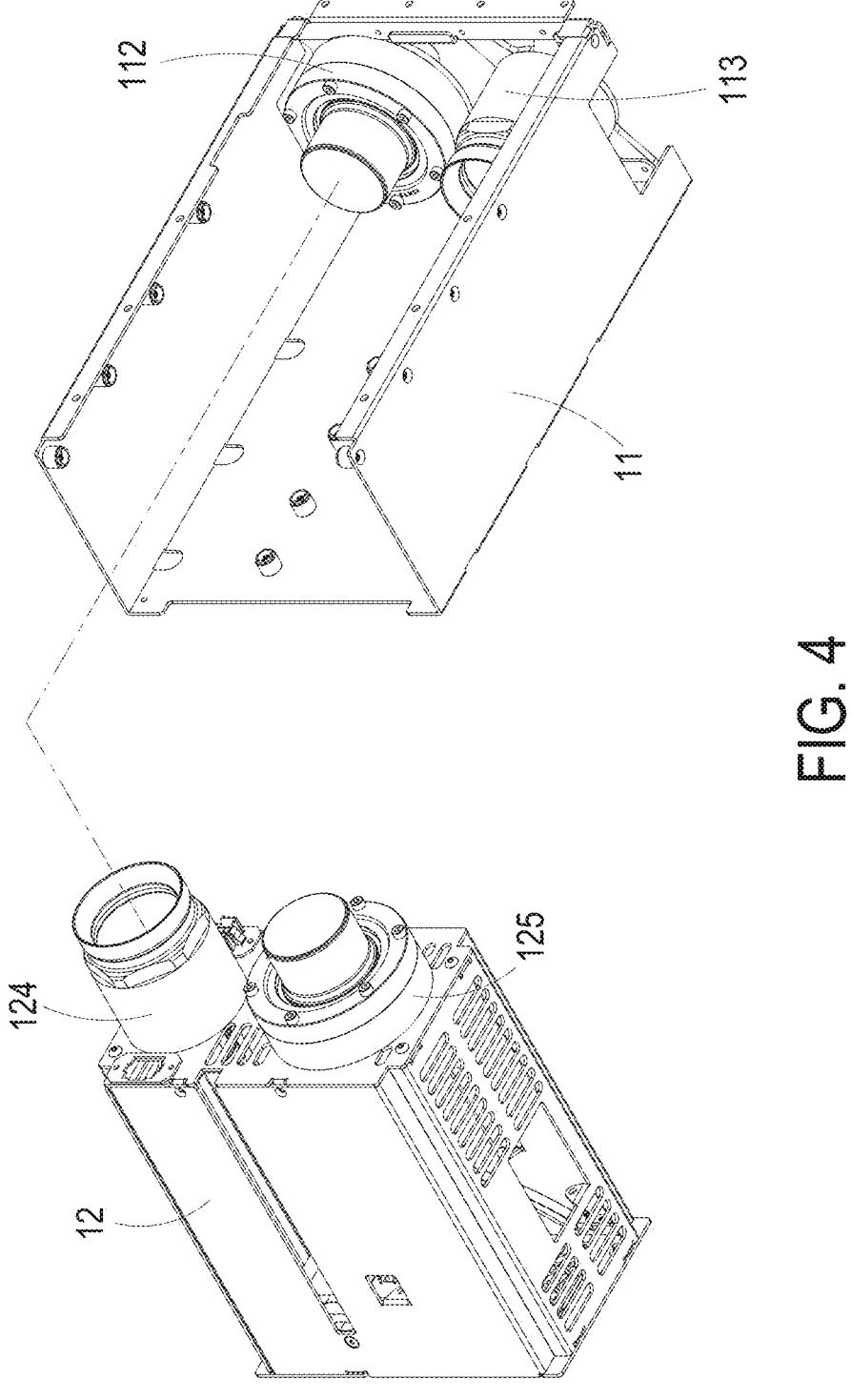
FIG. 4 is a schematic perspective view illustrating the cooling distribution unit of FIG. 1, wherein the removable unit is detached from the main body.

On the contrary, for disassembling the cooling distribution unit 1, the step of FIG. 3C, the step of FIG. 3B and the step of FIG. 3A are performed sequentially. That is, the first guiding structure 111 is moved from the rear end 134 of the guiding slot 131 to the front end 133 of the guiding slot 131 in response to the rotation of the adjustment mechanism 13. Consequently, the removable unit 12 is detached from the main body 11 as shown in FIG. 4.

Please refer to FIGS. 3A, 3B and 3C again. The cooling distribution unit 1 is assembled after the adjustment mechanism 13 is rotated in the counterclockwise direction, and the cooling distribution unit 1 is disassembled after the adjustment mechanism 13 is rotated in the clockwise direction. It is noted that numerous modifications and alterations may be made while retaining the teachings of the disclosure. For example, in another embodiment, the rotating direction or the moving direction of the adjustment mechanism 13 is changed.

From the above descriptions, the removable unit 12 can be selectively locked on the main body 11 or detached from the main body 11 in an effort-saving manner by simply rotating the adjustment mechanism 13. Consequently, the purpose of assembling or disassembling the cooling distribution unit 1 can be achieved. Moreover, the process of replacing the pump 122 is simplified and performed at a faster speed.

Please refer to FIG. 2A again. In an embodiment, the adjustment mechanism 13 further includes a self-locking structure 134a formed in a sidewall of the guiding slot 131. When the removable unit 12 is locked on the main body 11, the adjustment mechanism 13 is fixed through the self-locking structure 134a. Consequently, the adjustment mechanism 13 is prevented from rotating by itself without applying force to limit the first guiding structure 111 in the guiding slot 131 to move toward the front end 133. For example, the self-locking structure 134a is a notch that is formed in the sidewall of the rear end of the guiding slot 131. The shape of the self-locking structure 134a matches the shape of the cam (i.e., the first guiding structure 111). When the adjustment mechanism 13 is rotated to the situation of FIG. 3C, the cam (i.e., the first guiding structure 111) is engaged with the self-locking structure 134a. Consequently, the adjustment mechanism 13 is fixed and not rotated by itself.

It is noted that the numbers of the at least one first guiding structure 111, the at least one second guiding structure 123 and the at least one guiding slot 131 are not restricted. For example, in another embodiments, the main body 11 includes a plurality of first guiding structures 111, and the removable unit 12 includes a plurality of second guiding structures 123. The plurality of first guiding structures 111 and the corresponding second guiding structures 123 are coupled with each other. Moreover, the adjustment mechanism 13 includes a plurality of guiding slots 131. The number of the first guiding structures 111, the number of the second guiding structures 123 and the number of the guiding slots 131 are identical. Moreover, during the process of locking the removable unit 12 on the main body 11 or detaching the removable unit 12 from the main body 11, the plurality of first guiding structures 111 or the plurality of second guiding structures 123 are disposed within the corresponding guiding slot 131. When the number of the first guiding structures 111, the number of the second guiding structures 123 and the number of the guiding slots 131 are greater, the removable unit 12 can be locked on the main body 11 or detached from the main body 11 with less effort. In some other embodiments, the first guiding structure 111 includes a plurality of first sub-guiding structures, the second guiding structure 123 includes a plurality of second sub-guiding structures, the guiding slot 131 includes a plurality of sub-guiding slots, and the plurality of first sub-guiding structures are coupled with the corresponding second sub-guiding structures. A number of the plurality of first sub-guiding structures, a number of the plurality of second sub-guiding structures and a number of the plurality of sub-guiding slots are identical. While the removable unit 12 is locked on the main body 11 or the removable unit 12 is detached from the main body 11, the plurality of first sub-guiding structures or the plurality of second sub-guiding structures are disposed within the corresponding sub-guiding slots.

In an embodiment, as shown in FIGS. 2B and 4, the removable unit 12 further includes a first fluid connector 124 and a second fluid connector 125, and the main body 11 further includes a third fluid connector 112 and a fourth fluid connector 113. The pump 122 is connected between a first end of the first fluid connector 124 and a first end of the second fluid connector 125. The second end of the first fluid connector 124 is connected with the third fluid connector 112 of the main body 11. The second end of the second fluid connector 125 is connected with the fourth fluid connector 113 of the main body 11. It is noted that the positions of the first fluid connector 124 and the second fluid connector 125 may be exchanged and the positions of the third fluid connector 112 and the fourth fluid connector 113 may be exchanged. Preferably but not exclusively, the first fluid connector 124 is an inlet, and the second fluid connector 125 is an outlet.

Figure 5:
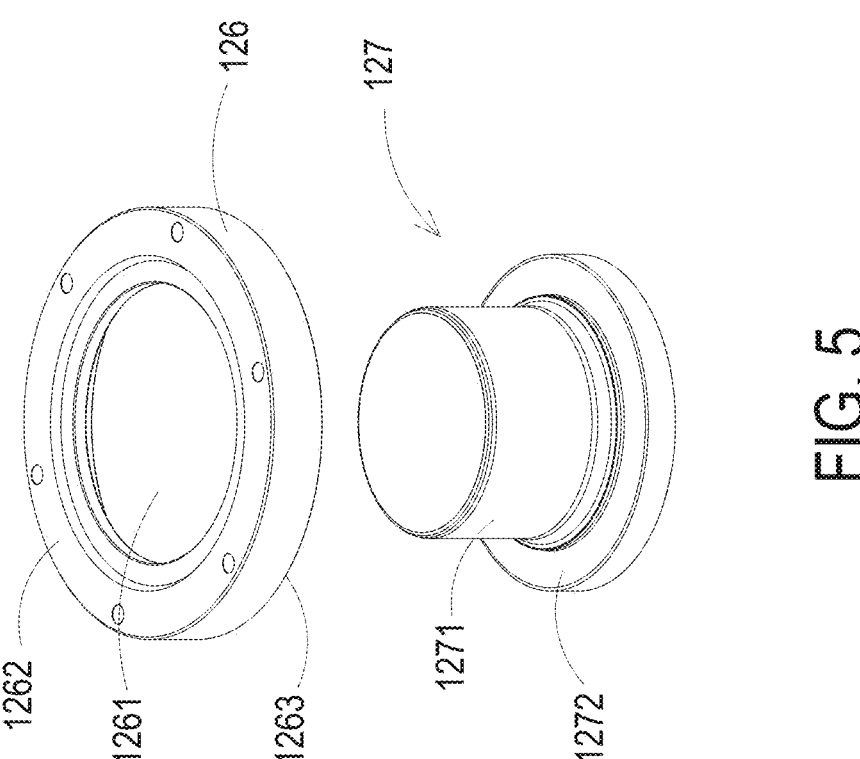
FIG. 5 is a schematic perspective view illustrating a second fluid connector of the removable unit of FIG. 4.

FIG. 5 is a schematic perspective view illustrating a second fluid connector of the removable unit of FIG. 4. In an embodiment, as shown in FIGS. 4 and 5, the second fluid connector 125 of the removable unit 12 includes a ring member 126 and a plunger 127. The ring member 126 has an opening 1261, a first surface 1262 and a second surface 1263. The first surface 1262 and the second surface 1263 are opposed to each other. The plunger 127 has a protrusion 1271 and a flange 1272. The protrusion 1271 has an upper end and a lower end. The flange 1272 is extended outwardly from the circumference of the lower end of the protrusion 1271. The protrusion 1271 of the plunger 127 is penetrated through the opening 1261 of the ring member 126 from the second surface 1263 to the first surface 1262. The flange 1272 is in contact with the second surface 1263 of the ring member 126. The plunger 127 is movable with respect to the ring member 126. When the removable unit 12 is detached from the main body 11, the second fluid connector 125 is away from the fourth fluid connector 113. Meanwhile, the plunger 127 of the second fluid connector 125 is not moved with respect to the ring member 126 and the opening 1261 of the ring member 126 is sealed by the plunger 127, so that the second fluid connector 125 is in a closed state. During the processing of locking the removable unit 12 on the main body 11, the fourth fluid connector 113 of the main body 11 is in contact with the plunger 127 of the second fluid connector 125 and pushes the plunger 127 to move with respect to the ring member 126. Meanwhile, the second fluid connector 125 is connected with the fourth fluid connector 113 and the opening 1261 of the ring member 126 is not sealed by the plunger 127, so that the second fluid connector 125 is in an opened state. Consequently, the fluid can be transferred between the second fluid connector 125 and the fourth fluid connector 113. In an embodiment, the second fluid connector 125 and the third fluid connector 112 have same structures, and the first fluid connector 124 and the fourth fluid connector 113 have same structures. By using the above fluid connectors, the blind-mating connections between the fluid connectors can be performed and the requirements of accuracy can be reduced.

From the above descriptions, the present disclosure provides a cooling distribution unit and an assembling/disassembling method of the cooling distribution unit. The cooling distribution unit includes a main body, a removable unit with a pump and an adjustment mechanism. The removable unit can be selectively locked on the main body or detached from the main body in an effort-saving manner by simply rotating the adjustment mechanism. Consequently, the purpose of assembling or disassembling the cooling distribution unit can be achieved. Moreover, the process of replacing the pump is simplified and performed at a faster speed.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cooling distribution unit, comprising:
a main body comprising a first guiding structure;
a removable unit comprising a casing, a pump and a second guiding structure, wherein the pump is disposed within the casing, and the first guiding structure and the second guiding structure are coupled with each other; and
an adjustment mechanism comprising a guiding slot and a fulcrum part, wherein the guiding slot has a front end and a rear end, and the front end has an entrance, wherein a distance between a center of the front end of the guiding slot and the fulcrum part is greater than a distance between a center of the rear end of the guiding slot and the fulcrum part,
wherein the first guiding structure is disposed at the front end of the guiding slot, when first guiding structure is moved to the rear end of the guiding slot in response to a rotation of the adjustment mechanism, the removable unit is moved toward the main body, and the first guiding structure is disposed at the rear end of the guiding slot as a locking position, when the first guiding structure is moved from the rear end of the guiding slot to the front end of the guiding slot in response to the rotation of the adjustment mechanism, the removable unit is disconnected from the main body.

2. The cooling distribution unit according to claim 1, wherein while the first guiding structure or the second guiding structure is moved from the rear end of the guiding slot to the front end of the guiding slot in response to the rotation of the adjustment mechanism, a distance between the first guiding structure and the fulcrum part is gradually increased.

3. The cooling distribution unit according to claim 1, wherein the first guiding structure of the main body is a cam, and the second guiding structure of the removable unit is a guide rail, wherein while the removable unit is locked on the main body or the removable unit is disconnected from the main body, the cam is moved within the guiding slot and moved along the guide rail.

4. The cooling distribution unit according to claim 1, wherein when the removable unit is locked on the main body, the pump is in communication with the main body.

5. The cooling distribution unit according to claim 4, wherein the removable unit further comprises a first fluid connector and a second fluid connector, and the main body further comprises a third fluid connector and a fourth fluid connector, wherein the pump is connected between a first end of the first fluid connector and a first end of the second fluid connector, a second end of the first fluid connector is connected with the third fluid connector, and a second end of the second fluid connector is connected with the fourth fluid connector.

6. The cooling distribution unit according to claim 5, wherein the second fluid connector comprises:
a ring member having an opening, a first surface and a second surface, wherein the first surface and the second surface are opposed to each other; and
a plunger having a protrusion and a flange, wherein the protrusion has an upper end and a lower end, the flange is extended outwardly from a circumference of the lower end of the protrusion, the protrusion is penetrated through the opening of the ring member from the second surface to the first surface, the flange is in contact with the second surface of the ring member, and the plunger is movable with respect to the ring member.

7. The cooling distribution unit according to claim 6, wherein when the removable unit is detached from the main body, the second fluid connector is away from the fourth fluid connector, the plunger of the second fluid connector is not moved with respect to the ring member and the opening of the ring member is sealed by the plunger, so that the second fluid connector is in a closed state.

8. The cooling distribution unit according to claim 6, wherein when the removable unit is locked on the main body, the fourth fluid connector of the main body is in contact with the plunger of the second fluid connector and pushes the plunger to move with respect to the ring member, the second fluid connector is connected with the fourth fluid connector and the opening of the ring member is not sealed by the plunger, so that the second fluid connector is in an opened state.

9. The cooling distribution unit according to claim 5, wherein the second fluid connector and the third fluid connector have same structures, and the first fluid connector and the fourth fluid connector have same structures.

10. A cooling distribution unit, comprising:
a main body comprising a first guiding structure;
a removable unit comprising a casing, a pump and a second guiding structure, wherein the pump is disposed within the casing, and the first guiding structure and the second guiding structure are coupled with each other; and
an adjustment mechanism comprising a guiding slot, a fulcrum part and a self-locking structure, wherein the guiding slot has a front end and a rear end, and the front end has an entrance, wherein a distance between a center of the front end of the guiding slot and the fulcrum part is greater than a distance between a center of the rear end of the guiding slot and the fulcrum part, and the self-locking structure is a notch formed in a sidewall of the rear end of the guiding slot,
wherein while the removable unit is moved to the rear end of the guiding slot as a locking position, a shape of the notch of the self-locking structure matches a shape of the first guiding structure, so as to fix the adjustment mechanism through the matching structures of the self-locking structure and the first guiding structure.

11. An assembling/disassembling method of a cooling distribution unit, the assembling/disassembling method comprising steps of:

providing a main body, a removable unit, a guiding structure and an adjustment mechanism, wherein the removable unit comprises a pump, the guiding structure is disposed on the main body, the adjustment mechanism comprises a guiding slot and a fulcrum part, the guiding slot has a front end and a rear end, and the front end has an entrance, wherein a distance between a center of the front end of the guiding slot and the fulcrum part is greater than a distance between a center of the rear end of the guiding slot and the fulcrum part; and rotating the adjustment mechanism, and selectively moving the guiding structure from the entrance of the front end of the guiding slot to the rear end of the guiding slot or moving the guiding structure from the rear end of the guiding slot to the entrance of the front end of the guiding slot, wherein when the guiding structure is moved from the entrance of the front end of the guiding slot to the rear end of the guiding slot in response to a rotation of the adjustment mechanism, the removable unit is moved toward the main body, and the first guiding structure is disposed at the rear end of the guiding slot as a locking position, wherein when the guiding structure is moved from the rear end of the guiding slot to the entrance of the front end of the guiding slot in response to the rotation of the adjustment mechanism, the removable unit is disconnected from the main body.

\* \* \* \* \*